United States Patent

Palynchuk et al.

(10) Patent No.: US 9,250,052 B2
(45) Date of Patent: Feb. 2, 2016

(54) WELDING GAUGE

(71) Applicants: Alexander Palynchuk, Sturgeon County (CA); Mark Palynchuk, Sturgeon County (CA)

(72) Inventors: Alexander Palynchuk, Sturgeon County (CA); Mark Palynchuk, Sturgeon County (CA); Alan Palynchuk, Sturgeon County (CA)

(73) Assignee: Western Instruments, Inc., Sturgeon County, AB (CA)

( * ) Notice: Subject to any disclaimer, the term of this patent is extended or adjusted under 35 U.S.C. 154(b) by 0 days.

(21) Appl. No.: 14/270,936

(22) Filed: May 6, 2014

(65) Prior Publication Data

US 2015/0082646 A1 Mar. 26, 2015

Related U.S. Application Data

(60) Provisional application No. 61/820,063, filed on May 6, 2013.

(51) Int. Cl.
*G01B 5/14* (2006.01)
*G01B 5/00* (2006.01)

(52) U.S. Cl.
CPC .................................... *G01B 5/0037* (2013.01)

(58) Field of Classification Search
CPC .................................................... G01B 5/0037
USPC ........... 33/452, 454, 456, 465, 501, 562, 613, 33/645, 833
See application file for complete search history.

(56) References Cited

U.S. PATENT DOCUMENTS

| | | | |
|---|---|---|---|
| 301,843 A | 7/1884 | Lycan | |
| 2,389,842 A * | 11/1945 | Cummins | G01B 3/00 33/833 |
| 2,399,579 A | 4/1946 | Smith | |
| D203,604 S | 2/1966 | LoJacono | |
| 3,597,848 A | 8/1971 | Matson | |
| 4,060,900 A | 12/1977 | Greenwood | |
| D266,231 S | 9/1982 | Windscheffel | |
| D271,185 S | 11/1983 | Dermond | |
| 4,485,558 A | 12/1984 | Lycan | |
| 4,497,115 A | 2/1985 | Dearman | |
| 4,498,239 A * | 2/1985 | Epstein | G01B 3/32 33/567 |
| 4,545,124 A | 10/1985 | Brooks | |
| 4,637,142 A * | 1/1987 | Baker | G01B 5/02 33/473 |
| 4,638,564 A * | 1/1987 | Burrows | B23Q 3/007 33/464 |
| 4,702,012 A | 10/1987 | Miller | |
| 4,924,580 A | 5/1990 | Garofalo et al. | |

(Continued)

FOREIGN PATENT DOCUMENTS

CH 203464 3/1939
DE 1033914 10/1958

(Continued)

*Primary Examiner* — G. Bradley Bennett
(74) *Attorney, Agent, or Firm* — Juneau & Mitchell

(57) ABSTRACT

A comprehensive welding gauge two or more of: a ruler, a weld height gauge, a protractor gauge, a Hi-Lo gauge, and a fillet height gauge, wherein each measurement device overlays a measurement scale on a main gauge plate and is riveted to the main gauge plate such that the measurement device may be extended beyond and retracted within the main gauge plate borders, either by sliding or rotating. The comprehensive gauge may thus be easily stored in and retrieved from a pocket by the user.

20 Claims, 13 Drawing Sheets

(56) References Cited

U.S. PATENT DOCUMENTS

| | | | |
|---|---|---|---|
| 5,465,498 A | 11/1995 | Lycan | |
| 5,611,149 A * | 3/1997 | Fujiwara | G01B 5/0037 33/534 |
| 5,915,806 A | 6/1999 | Levee | |
| 6,421,928 B1 * | 7/2002 | Miller | A47G 1/205 33/520 |
| 6,505,410 B1 * | 1/2003 | Lycan | G01B 5/0037 33/1 N |
| 2004/0006880 A1 * | 1/2004 | Evans | B25H 7/00 33/460 |
| 2005/0102848 A1 * | 5/2005 | Murphy | G01C 15/002 33/227 |
| 2008/0276475 A1 * | 11/2008 | Schafer | G01B 3/34 33/501.45 |
| 2014/0230263 A1 * | 8/2014 | Livitski | G01B 5/0037 33/701 |

FOREIGN PATENT DOCUMENTS

| | | |
|---|---|---|
| NO | 68436 | 10/1944 |
| SU | 198685 | 8/1967 |

\* cited by examiner

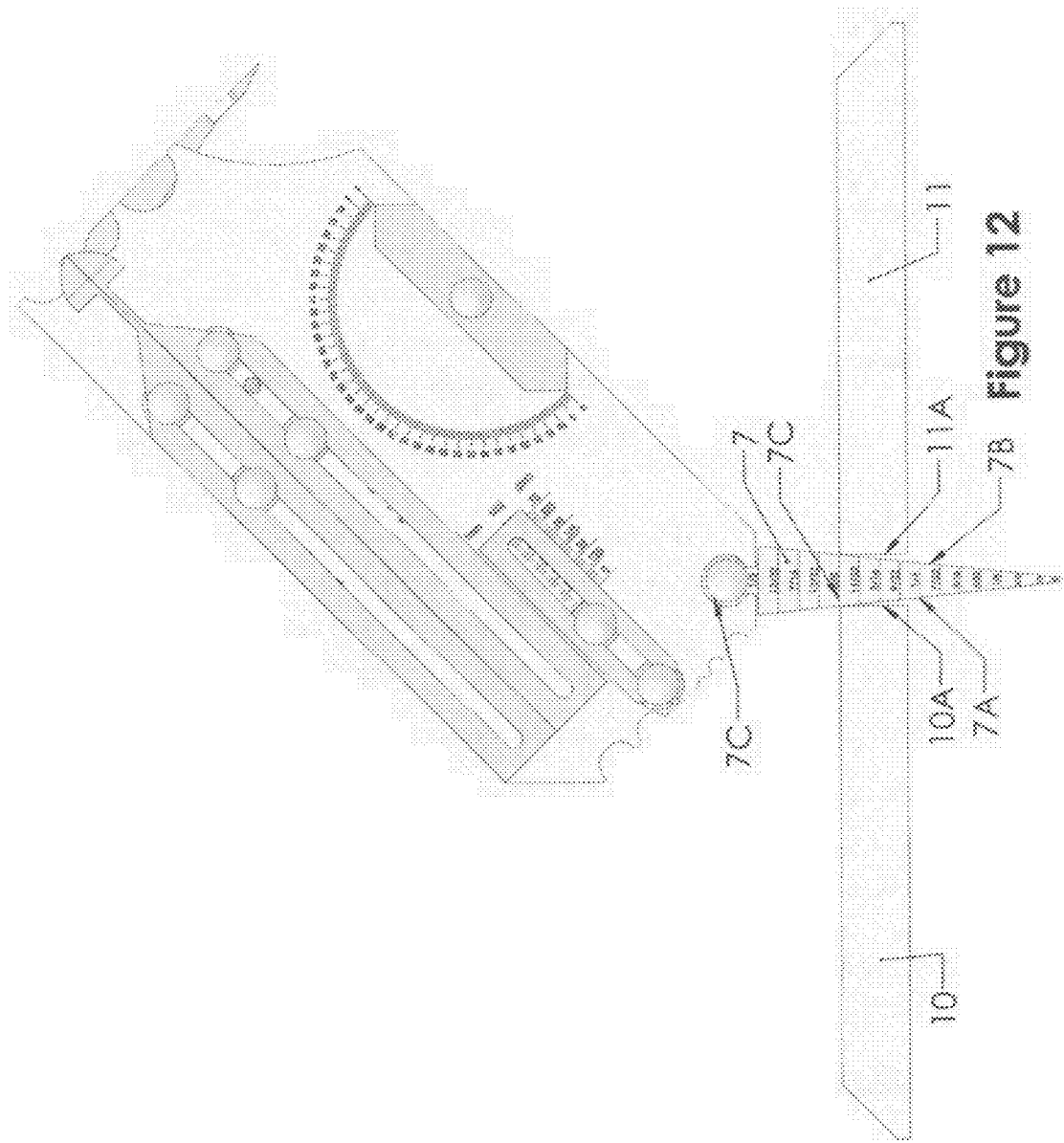

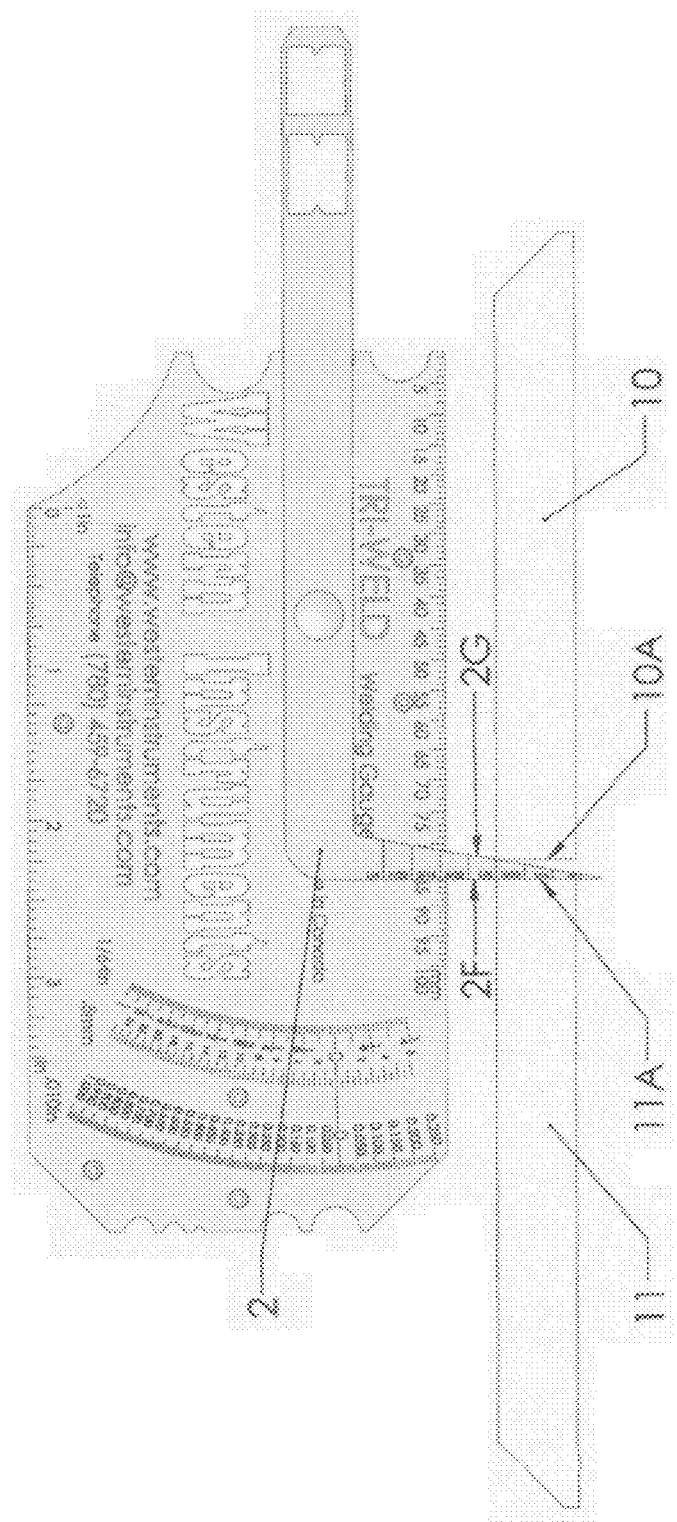

WELDING GAUGE

CROSS REFERENCE TO RELATED APPLICATIONS

This patent application claims priority to U.S. patent application 61/820,063, filed on May 6, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

The present invention relates to welding gauge used for the measurement of weld dimension parameters for fusion welding, typically utilizing Electric Arc Stick Welding, MIG (metallic inert gas), TIG (tungsten inert gas) or a similar welding process.

2. Background of the Invention

The current state of knowledge is as follows.

Welding gauges are used in fusion welding to measure multiple welding parameters, notably including the gap between the prepared edges of metal components, which can be steel, steel alloys, stainless steels, non-ferrous alloys and the like. Fillet weld depths and leg length also commonly require measurement, as does the angle of a prepared bevel when either joining plates or pipe ends.

Products currently on the market require multiple measurement devices to measure the various parameters that are required by welders and/or inspectors before, during and after fusion welding operations. Currently available gauges are often of a size and configuration such that they are difficult to carry without special belt attachments or other accoutrement, and also require recalibration or adjustment once they have been in use for a period of time. Thus, it is common for a welder or inspector on the job to have as many as six or seven gauges on his or her person in different locations, generally hanging from a belt and/or in pockets. Thus, each time a measurement is required, time is wasted locating and retrieving the proper gauge for the given measurement. Additionally, the risk of loss of a given gauge is much higher when the user is required to keep up with multiple devices.

Despite the fact that industry standards typically require recalibration of gauges every six to 12 months, such recalibration can be difficult or impractical with existing gauge models, often making replacement of a unit necessary.

Depending on the standards required by a given welding job, the welder must also decide which measurement scale is required by the governing protocols of the job. Depending upon such protocols, and often upon geographic location, the required scale can be 0.01 of an inch, 0.5 mm, or 1/64 of an inch. Many existing gauges allow for measurements in only one or two of the preferred scales, requiring a user to own and/or carry even more gauge devices.

Characteristics of such welding gauges are illustrated in U.S. patent application Ser. No. 09/523,741 to Palynchuk.

The object of the current invention is to provide users with a single, affordable welding gauge that can provide many types of fusion-welding measurements, can measure in each of the three preferred scales, is easy to carry and reduces both the difficulty and frequency of recalibration.

BRIEF SUMMARY OF THE INVENTION

In a preferred embodiment, a welding gauge comprising: a main gauge plate and multiple measurement devices attached to such main gauge plate, including but not limited to two or more of: a ruler, a weld height gauge, a protractor gauge, a Hi-Lo gauge, and a fillet height gauge, wherein each measurement device overlays a measurement scale on the main gauge plate and is riveted to the main gauge plate such that the device may be extended beyond and retracted within the main gauge plate borders, either by sliding or rotating.

In another preferred embodiment, the welding gauge as described herein, further comprising a taper gauge.

In another preferred embodiment, the welding gauge as described herein, wherein the main gauge plate and all other components are manufactured from the group of materials consisting of: stainless steel, aluminum, titanium, another non-magnetic metal or alloy, or plastic.

In another preferred embodiment, the welding gauge as described herein, wherein the main gauge plate is comprised of aluminum and is anodized.

In another preferred embodiment, the welding gauge as described herein, wherein the measurement scales are laser etched into the anodized surface of the main gauge plate.

In another preferred embodiment, the welding gauge as described herein, wherein the articulated parts are comprised of stainless steel.

In another preferred embodiment, the welding gauge as described herein, the welding gauge as described herein, further comprising wherein each rivet protrudes through a wave washer, made of either metal or plastic, situated between the main gauge plate and the riveted measurement device.

In another preferred embodiment, the welding gauge as described herein, wherein each measurement scale comprises one or more scales from the group consisting of: a 0.5 mm scale, a 1.0 mm scale, a 0.01 inch scale, a 1/64 inch scale, a 1/32 inch scale, a 0.0313 inch scale, or degrees.

In another preferred embodiment, the welding gauge as described herein, wherein the main gauge plate further comprises on its edge(s) one or more marked, semicircular cutouts on the edges of the main gauge plate for quickly measuring the diameter of circular objects.

In another preferred embodiment, the welding gauge as described herein, wherein the fully-assembled gauge has a depth of no more than 1/4 inch.

In another preferred embodiment, the welding gauge as described herein, wherein the fully-assembled gauge, with all gauge arms retracted within the borders of the main gauge plate, has a length of no more than 6" and a height of no more than 3".

In another preferred embodiment, the welding gauge as described herein, wherein the weld height gauge comprises an L-shaped pivot arm, such pivot arm comprising a point at the end of its shorter member for resting on a weld, and one or more windows cut into its larger member, such window(s) overlaying one or more scale markings allowing the user to measure weld height.

In another preferred embodiment, the welding gauge as described herein, wherein the shorter member of the L-shaped pivot arm is marked with a scale, allowing such shorter to serve as a taper gauge.

In another preferred embodiment, the welding gauge as described herein, wherein the protractor gauge comprises a hexagonal protractor arm with two interchangeable ends, each comprising a point, wherein one end rotates to extend beyond the border of the main gauge plate and the other end overlays a semicircular protractor scale indicating the measurement of an angle in degrees.

In another preferred embodiment, the welding gauge as described herein, wherein each Hi-Lo gauge comprises two adjacent, parallel Hi-Lo arms, with each such arm comprising a pointed end and a flat end, wherein each Hi-Lo arm slides independently of the other, allowing each Hi-Lo arm's pointed end to extend past the border of the main gauge plate, and wherein each measurement edge overlays one or more measurement scales on the main gauge plate, thereby allowing the measurement of the disparity in the heights of two adjacent points.

In another preferred embodiment, the welding gauge as described herein, wherein the fillet height gauge comprises an arm that slides back and forth, wherein the arm comprises a pointed end and a flat end, with the pointed end sliding to extend past the border of the main gauge plate, and the flat end overlaying one or more measurement scales on the main gauge plate.

In another preferred embodiment, the welding gauge as described herein, wherein the taper gauge comprises a taper gauge arm, such taper gauge arm comprising a tapered end, a riveted end and one or more measurement scales marked on the face(s) of the taper gauge arm, wherein the tapering gauge arm rotates around the riveted end, allowing the tapered end to extend beyond the borders of the main gauge plate.

In another preferred embodiment, the welding gauge as described herein, wherein the taper gauge arm is comprised of anodized aluminum and one or more scales are marked on the taper gauge arm by laser etching.

In another preferred embodiment, welding gauge comprising: a main gauge plate and multiple measurement devices, including but not limited to: a ruler, a weld height gauge, a protractor gauge, a Hi-Lo gauge, and a fillet height gauge, wherein each measurement device overlays a measurement scale on the main gauge plate and is riveted to the main gauge plate such that the device may be extended beyond and retracted within the main gauge plate borders, and wherein (i) each of the weld height gauge and protractor gauge are single-rived to the main gauge plate, allowing the arm of each such gauge to rotate, and (ii) each of the Hi-Lo gauge and the fillet gauge are double riveted through a channel in the arm(s) of such gauge, allowing each such arm to slide.

In another preferred embodiment, the welding gauge as described herein, wherein the arms of each of the weld height gauge, protractor gauge, Hi-Low gauge, and fillet height gauge are configured on the main gauge plate such that no such arm makes contact another welding gauge component when sliding or rotating.

BRIEF DESCRIPTION OF THE DRAWINGS

FIG. 12 is a line drawing evidencing the welding gauge from the back, engaging the taper gauge to measure the size of a gap.

FIG. 13 is a line drawing evidencing the welding gauge from the front, engaging the pivot arm to measure the size of a gap.

DETAILED DESCRIPTION OF THE INVENTION

Figure 1:
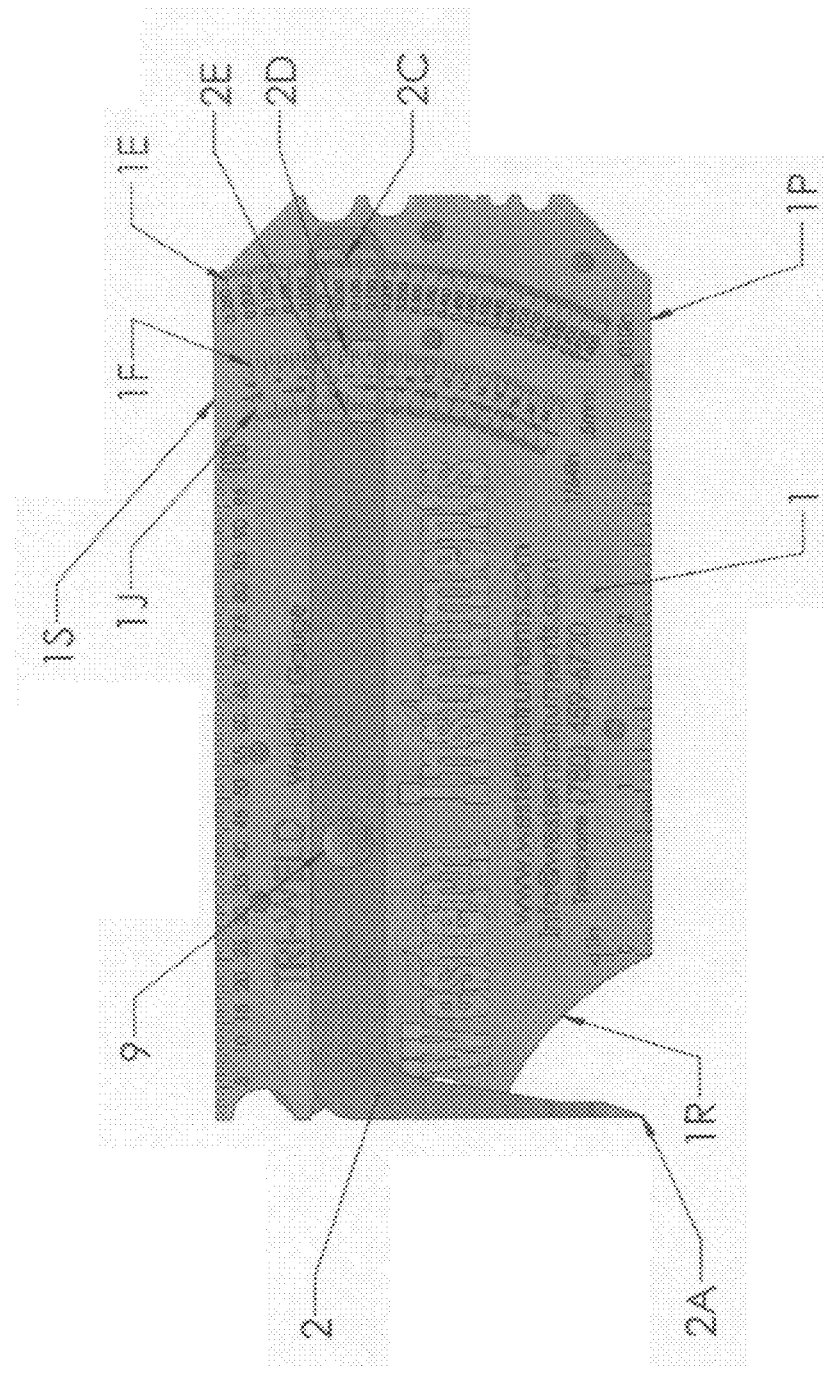
FIG. 1 is a line drawing evidencing the welding gauge from the front.

The disclosed invention is a novel iteration of a comprehensive welding gauge that comprises multiple measurement features, wherein each such measurement feature would have previously required the user to carry and retrieve a separate, free-standing gauge device. The invention first comprises a main gauge plate onto which all identification and measurement markings are drawn.

Each measurement feature is affixed to the main gauge plate with a rivet(s), and either rotates or slides to extend outside the borders of the main gauge plate when in use, then retracts back within the borders of the main plate when not in use. This allows metallic points and arms of the various measurement devices attached to the gauge to be indrawn for ease of storing and retrieving the gauge from the user's pockets.

In a preferred embodiment, all rivet assemblies comprise wave washers, which obviate the need for adjustable thread devices as used in currently known welding gauges. The result is a thinner profile of gauge, without protrusions. Such wave washers may be made of metal, but may also be made of plastic or other soft, durable materials. Spring washers would also be a known alternative to the use of wave washers.

As a result of the rotating or sliding functionality of each measurement component comprising the gauge, the gauge itself, when not in use, presents a slim profile allows it to be stored easily inside of a short or pants pocket. While previously known welding gauges present the same or a similar size and profile, the fact that a welder has until now been forced to carry multiple gauges while on the job has prevented such ease of storage and retrieval.

In a preferred embodiment, the main gauge plate and all other components of the welding gauge are manufactured from one or more non-magnetic, metallic components. Preferred metals and alloys include but are not limited to aluminum, titanium and stainless steel. One or more components may also be manufactured using plastic. In a more preferred embodiment, all the main gauge plate is aluminum and all articulating parts are stainless steel.

In another preferred embodiment, the main gauge plate is 5" to 6" by 2.5" to ⅗". In a more preferred embodiment, the main gauge plate is approximately 5.5" by 2.75".

The main gauge plate is marked with multiple measurement scales for the various measurement devices. Such markings can be made on the main gauge plate using any known metal etching process, including but not limited to laser or acid etching. In a preferred embodiment, an aluminum main gauge plate is anodized to create a dark surface on which measurement markings can be laser etched, as laser etching allows for the highest level of accuracy in creating fine measurement scaling, and the etching of light markings into a black surface provides the user with the greatest level of visibility.

The measurement features that can be comprised within the comprehensive welding gauge are as follows:
- a ruler,
- a weld height gauge,
- a protractor gauge,
- a two-armed or Hi-Lo gauge,
- a fillet height gauge, and
- a taper gauge.

In a more preferred embodiment, the welding gauge will comprise all the features of the preceding sentence, and additionally comprise one or more marked, semicircular cutouts on the edges of the main gauge plate for quickly determining the diameter of circular objects (for example, 1/16", 1/8", 3/16", etc.).

In another preferred embodiment, the welding gauge, when fully assembled with all arms and rivets, can easily be placed into the shirt pocket or pants pocket of the user. In such preferred embodiment, the maximum depth of the welding gauge does not exceed ¼", the height of the welding gauge does not exceed 3" and the length of the welding gauge does not exceed 6".

Figure 10:
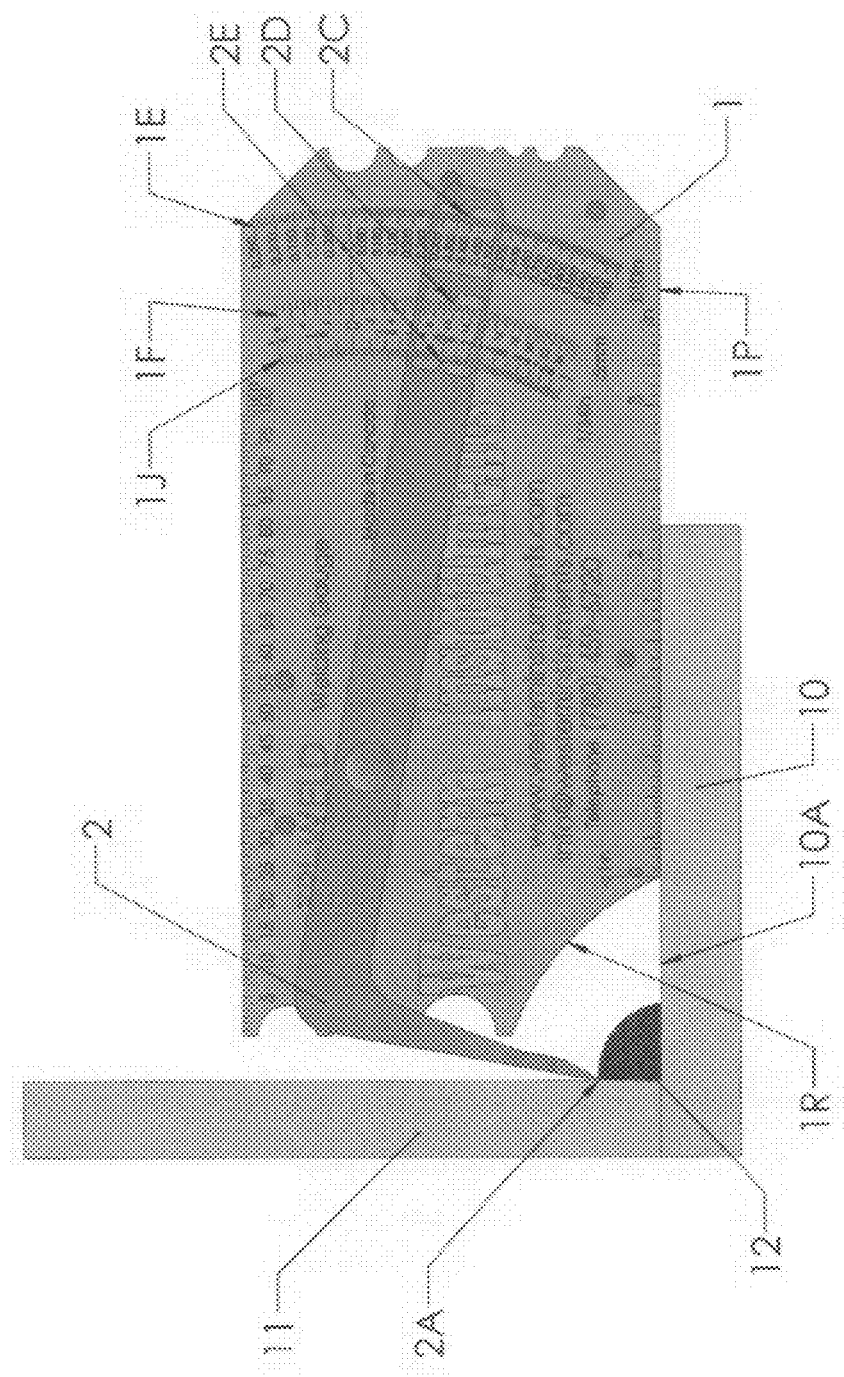
FIG. 10 is a line drawing evidencing the welding gauge from the front with the pivot arm engaged to measure a fillet leg length.

The welding gauge comprises an L-shaped pivot arm is used in measuring the height of lap joint fillet welds, as illustrated in FIG. 10. The longer aspect of the L-shaped pivot arm is single-riveted to the main gauge plate, allowing the entire L-shaped pivot arm to rotate. The free end of the shorter aspect of the pivot arm tapers to a pivot arm point, while the free end of the longer aspect of the pivot arm comprises one or more windows cut into the arm, through which the underlying main gauge plate is visible. Underlying the window(s) are one or more curved measurement scales, readable through the window(s), which allow for a measurement of the height of welds based on the placement of the pivot arm point.

In a preferred embodiment, the longer aspect of the L-shaped pivot arm is approximately 5.25 to 5.75" in length, while the shorter aspect of the pivot arm is approximately 1.75" to 2.25" in length. In a more preferred embodiment, the longer aspect of the pivot arm is approximately 5.375" long and the shorter aspect of the pivot arm is approximately 2" long.

Figure 6:
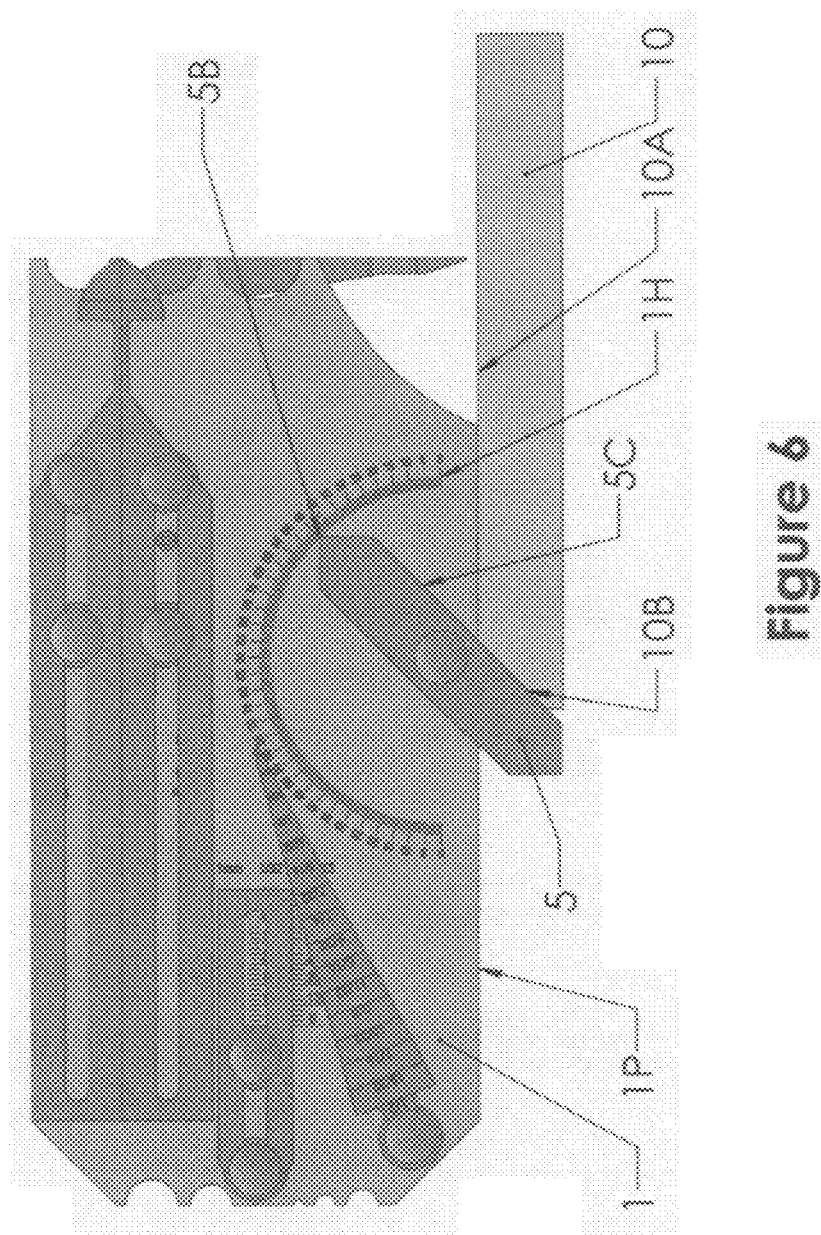
FIG. 6 is a line drawing evidencing the welding gauge from the front, measuring an angle of preparation.

The protractor gauge is to be used in measuring bevel angles as illustrated in FIG. 6. In a preferred embodiment, the protractor arm is hexagonal in shape, with two parallel long edges and each end tapered to a point by a pair of short edges, each cut at a 45° angle to the long edges. The protractor arm is single riveted at its center to the rear face of the main gauge plate, and thus rotates freely. Along the protractor arm's arc of rotation, a full 180° angle scale is marked on the rear face of the main gauge plate. So, when the lower edge of the main gauge plate is placed flush against a surface ending in a beveled edge, the protractor arm may be rotated downward against such beveled edge, thereby providing the angle of the bevel.

In a preferred embodiment, the protractor arm is approximately 2" in length and between 0.375" and 0.5" in width.

Figure 9:
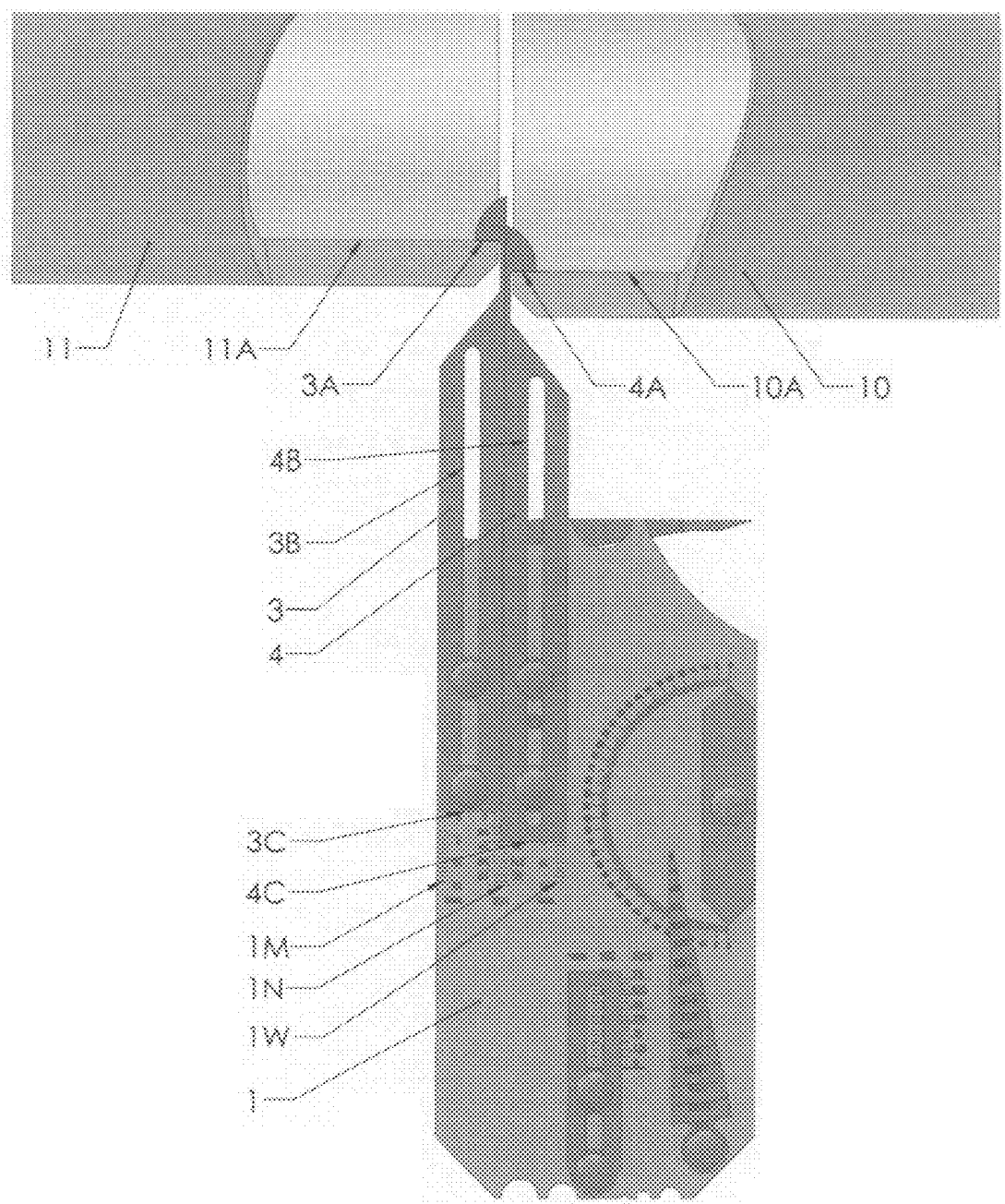
FIG. 9 is a line drawing evidencing the welding gauge from the back, engaged in measuring the alignment of the inner surfaces of pipes.

The Hi-Lo gauge comprises two adjacent, parallel Hi-Lo arms that slide independently of one another, thus allowing measurement of the difference in height between two adjacent surfaces on either side of a gap to be welded, as illustrated in FIG. 9. In a preferred embodiment, each Hi-Lo arm is arrow-shaped, comprising a wide section with a center channel, tapering to a shorter narrow section and ending in an arrowhead-like point that is flat on the side facing the opposite Hi-Low gauge. Each Hi-Lo arm will be double riveted to the main gauge plate, with the two rivets protruding through the center channel, thus allowing the arm to slide back and forth. The adjacent and parallel positioning of the arms will allow each point to slide beyond the border of the main gauge plate to make contact with a weld component at a varying depth.

In a preferred embodiment, each Hi-Lo arm is approximately 5" to 5.25" in length, and 0.5" in width at its widest point.

Figure 8:
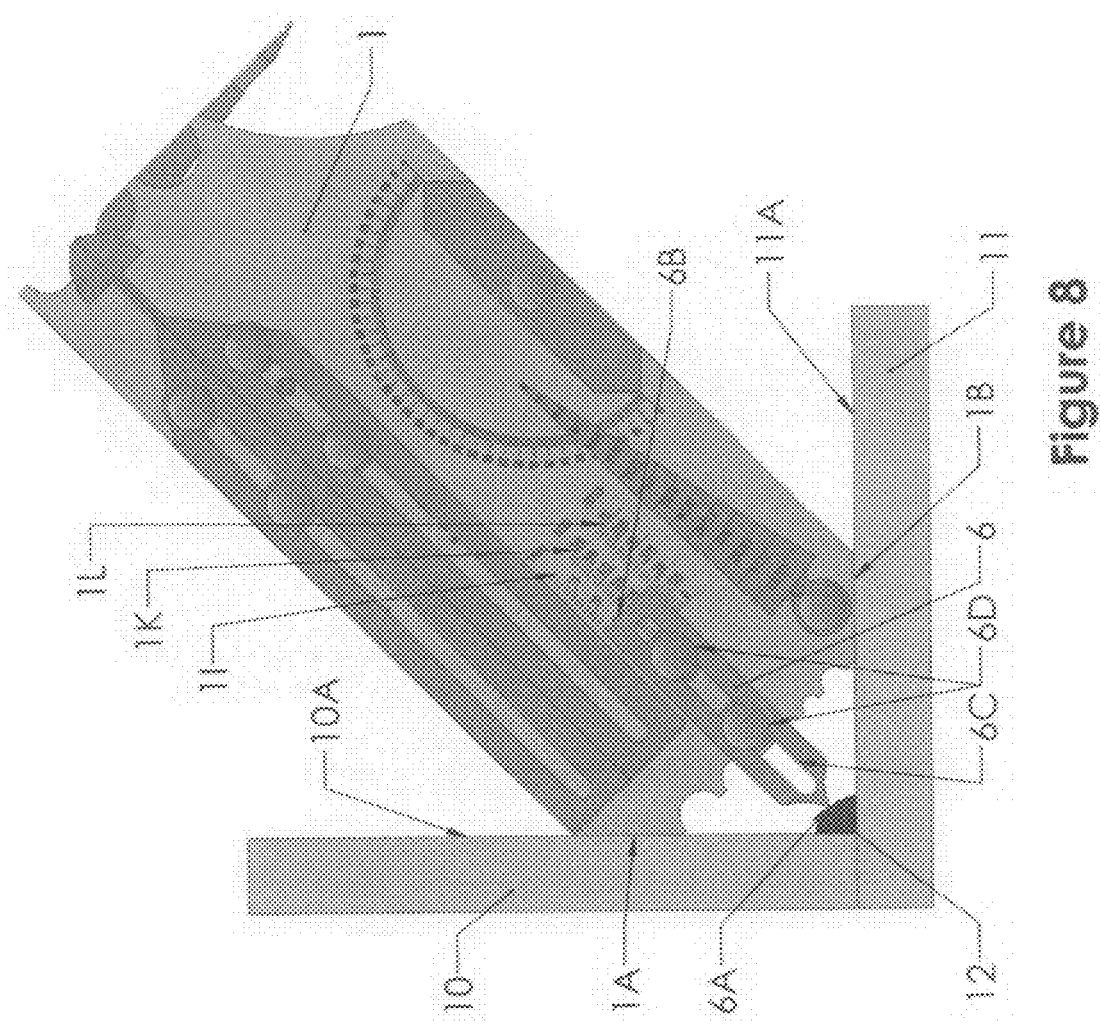
FIG. 8 is a line drawing evidencing the welding gauge from the back, engaged in measuring the height of a fillet weld.

The fillet height gauge comprises an arm with a point facing outward that is used to measure the height of Tee joint fillet welds, as illustrated in FIG. 8. The arm is double riveted to the main gauge plate, with both rivets extending through a channel running down the center of the arm and thus allowing the arm to slide forwards and back. The end of the arm opposite the point overlays a measurement scale or scales. Preferably, the scale includes both mm and inches. In a more preferred version, there are three scales: 1 mm, 1/32 inch and 0.0313 inch. Both corners of the main gauge plate on the side of the main gauge plate from which the fillet height gauge arm emanates are cut at a 45° angle, allowing that side of the plate to sit within a right angle Tee joint, with the sliding arm pointing directly at the weld in the middle of the joint. The arm can then be extended outward to measure the exact height of the fillet weld in the Tee joint.

In a preferred embodiment, the fillet height gauge arm is approximately 1.75" to 2" long and 0.375" to 0.5" wide.

A taper gauge is used in measuring gaps between plates, pipe ends, flanges and the like. As a free standing device, it generally comprises a spear head-shaped metal plate with measurement lines on its face extending back from the tapered end. In invention preferred embodiment, the taper gauge is a separate measurement arm, has a pointed end and is single riveted flat against the main gauge plate when not in use. When needed, the tapered end of the gauge rotates outward from the main gauge plate, where it can be inserted into a gap to measure the width of the gap, as illustrated in FIG. 12. In another preferred embodiment, the shorter aspect of the pivot arm is marked with a scale, so that it can also serve as a taper gauge, as illustrated in FIG. 13.

In a preferred embodiment, the portion of the taper gauge containing measurement lines is approximately 0.5" in length.

It must be noted that welding gauges are most often used in outdoor construction sites as well as in fabricating shops and other indoor manufacturing venues. During use in such scenarios, welding gauges are often subject to various types of trauma, including extreme temperatures, jostling and jarring.

DETAILED DESCRIPTION OF THE FIGURES

FIGS. 1 through 13 illustrate the design and assembly of the invention, as well as the typical uses of the various measurement devices comprised therein. All part numbers appearing in the figures may be traced to their descriptions in the "List of reference numbers" section herein below.

In a schematic illustration, FIG. 1 evidences the front face of the welding gauge 100, with pivot arm 2 riveted to the main gauge plate 1 with pivot arm rivet 9, with pivot arm tip 2A facing down and left, pivot arm arrows 2C, 2D and 2E respectively pointing through their related windows in the pivot arm 2 to the underlying pivot arm scales 1E, 1F and 1J.

Figure 2:
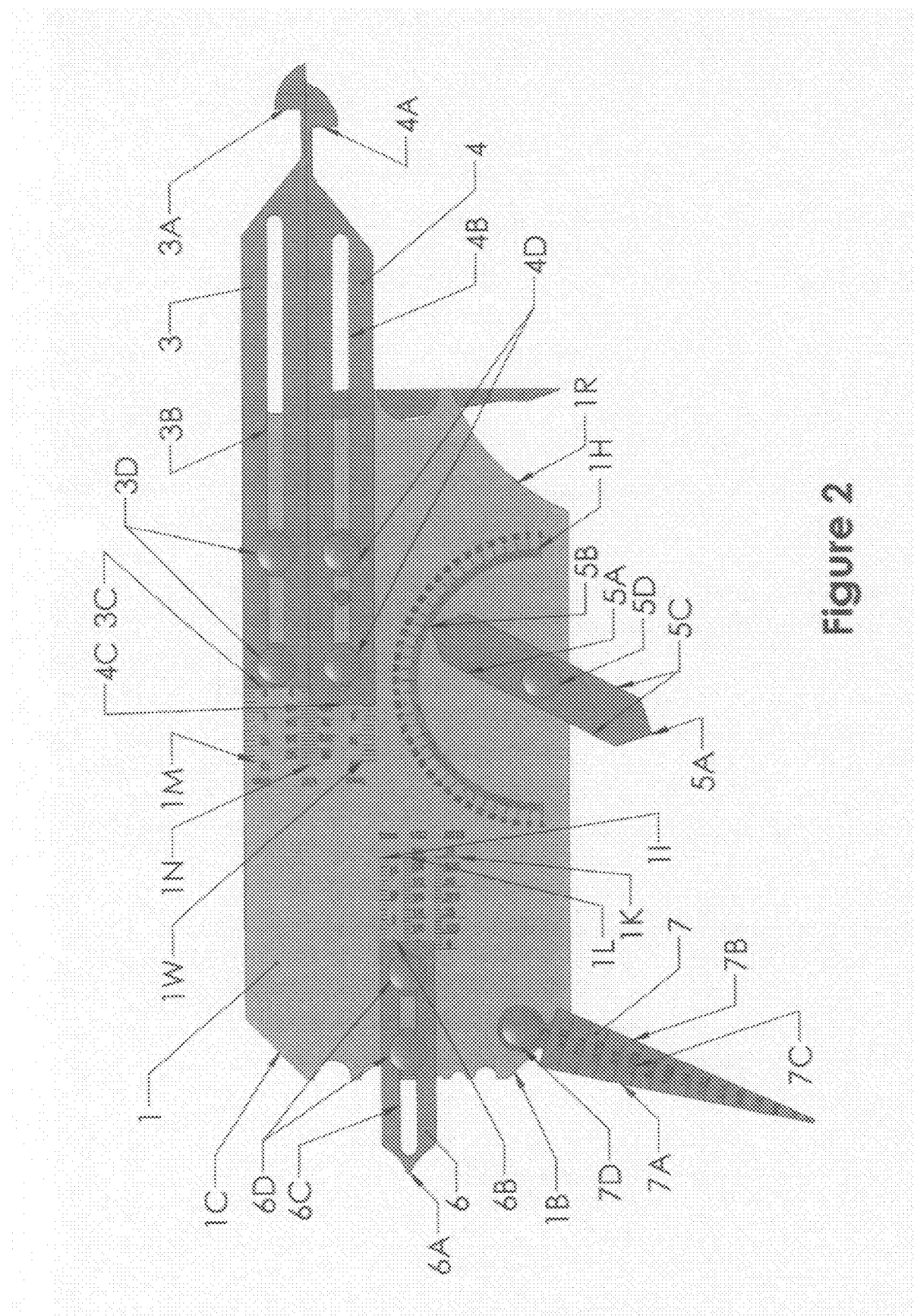
FIG. 2 is a line drawing evidencing the welding gauge from the back.

FIG. 2 is a schematic drawing of welding gauge 100, evidencing the rear face of main gauge plate 1, with all articulating pieces deployed beyond the borders of the main gauge plate 1. Protractor arm 5 has been rotated. Top Hi-Low arm 3 has been deployed rightward by sliding top Hi-Lo arm slot 3B over top Hi-Lo rivets 3D, with top Hi-Low arm tip 3A extending beyond the main gauge plate 1 border. Similarly, bottom Hi-Low arm 4 has been deployed rightward by sliding bottom Hi-Lo arm slot 4B over bottom Hi-Lo rivets 4D, with top Hi-Low arm tip 4A extending beyond the main gauge plate 1 border. Top and bottom Hi-Lo measurement edges 3C and 4C indicate measurements depths as they overlay right Hi-Lo mm scale 1M, Hi-Lo inches scale 1N and left Hi-Lo mm scale 1W, respectively.

Fillet height arm 6 has been deployed leftward by sliding fillet height arm slot 6C over fillet height arm rivets 6D, with fillet height arm point extending past the border of main gauge plate 1, and fillet height arm measurement edge 6B indicating measurement by overlaying fillet height mm scale 1I, fillet height 1/32 inch scale 1K and fillet height 0.0313 scale 1L. Taper gauge 7 also appear in its extended position, having been rotated outward around taper gauge rivet 7D.

Figure 3:
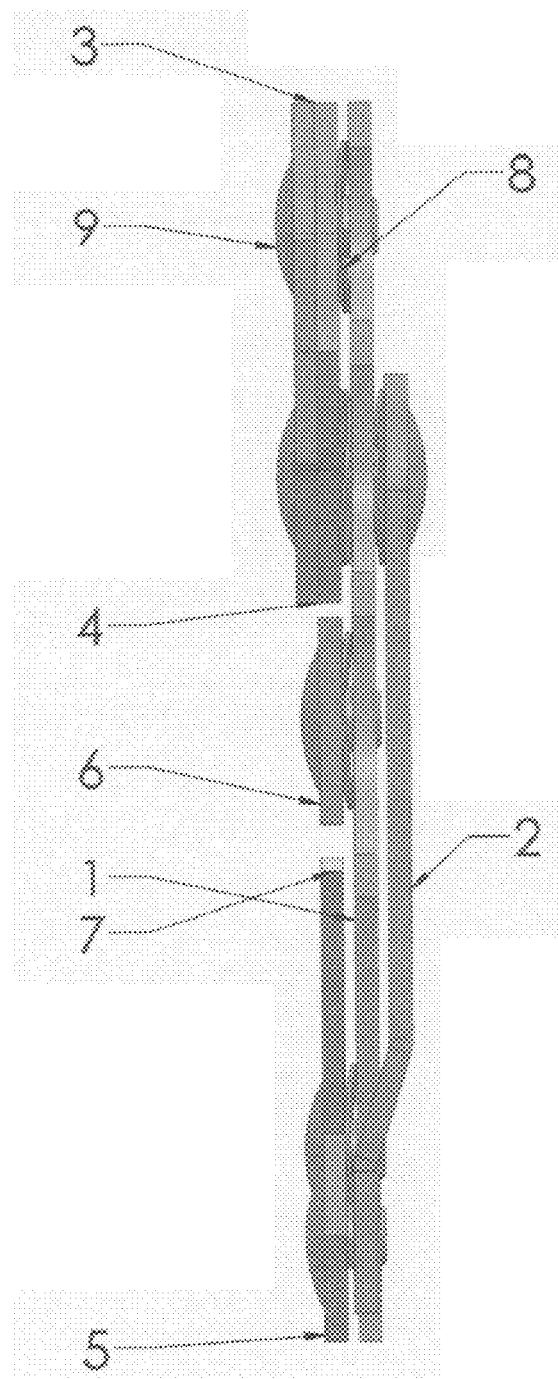
FIG. 3 is a line drawing evidencing an end view of the welding gauge from the right.

FIG. 3 is an end view of welding gauge 100 with each of pivot arm 2, top Hi-Lo arm 3, bottom Hi-Lo arm 4, protractor arm 5, fillet height arm 6 and taper gauge 7 fully retracted. Each measurement arm is shown riveted to main gauge plate 1 with the use of a wave washer 8.

Figure 4:
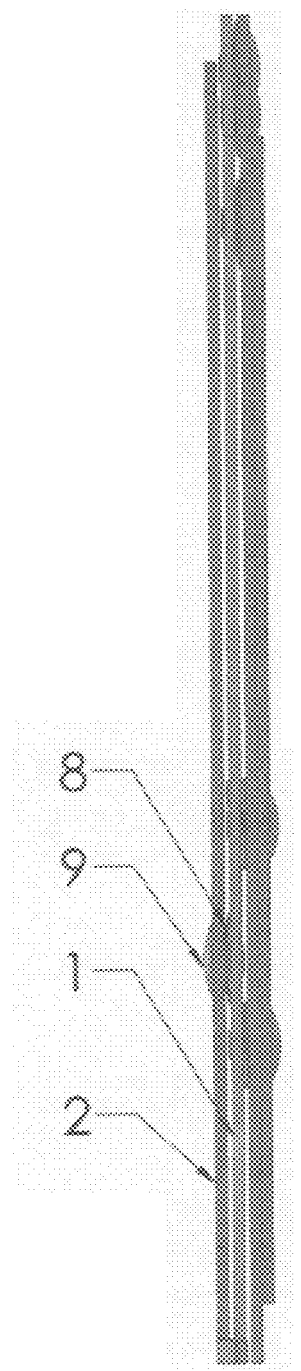
FIG. 4 is a line drawing evidencing a longitudinal view of the welding gauge from the bottom.

FIG. 4 is a longitudinal view of the welding gauge 100 with its articulating parts fully retracted, indicating pivot arm 2 overlaying wave washer 8 and main gauge plate 1 and attached by pivot arm rivet 9, which also extends through wave washer 8.

Figure 5:
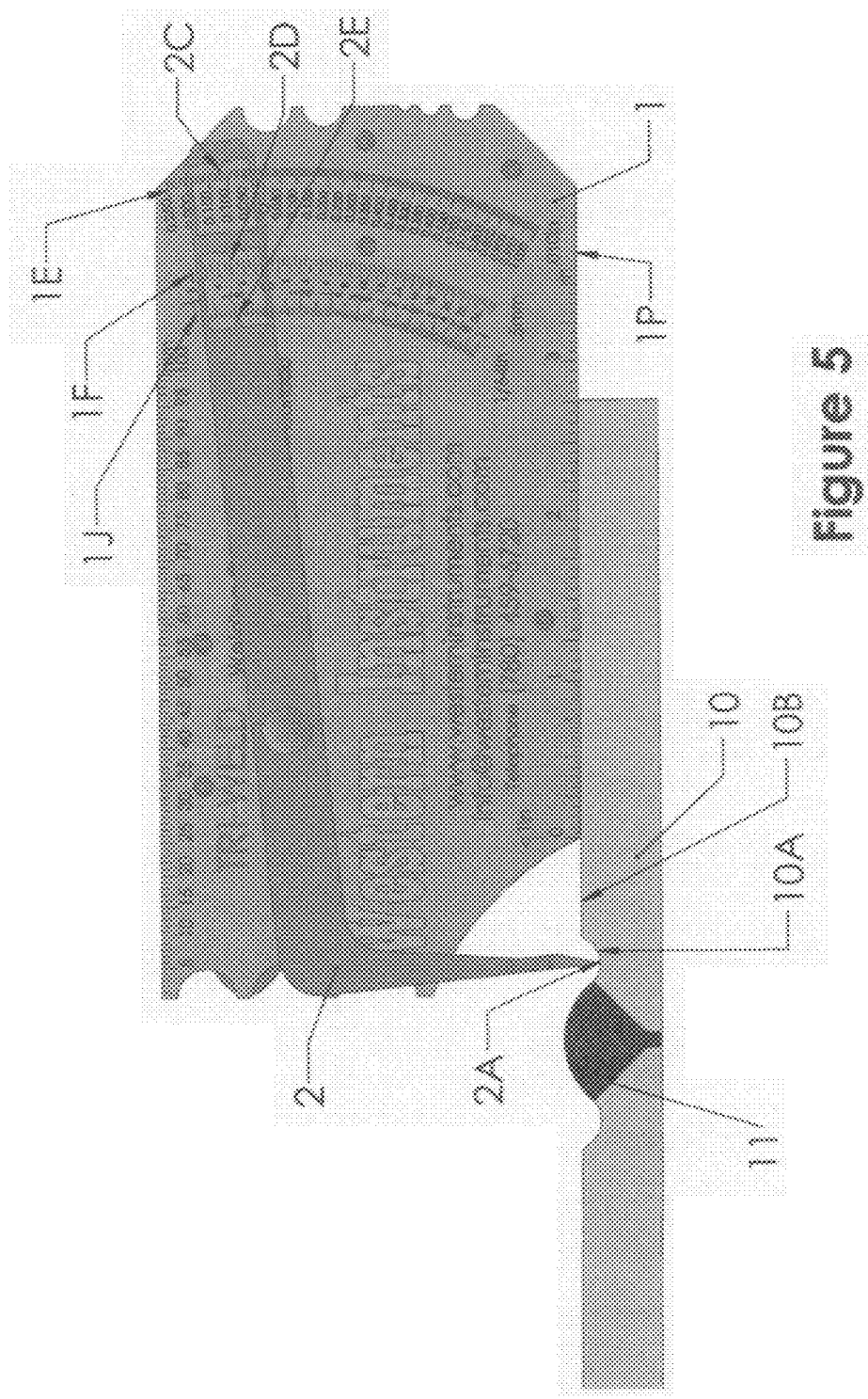
FIG. 5 is a line drawing evidencing the welding gauge from the front, with the pivot arm being engaged to measure an undercut.

FIG. 5 is a schematic drawing evidencing the weld gauge 100 measuring a fillet weld 11 between two adjacent pieces instead of a Tee joint weld, as in FIG. 4, however the pivot arm point 2A in this case is engaging the undercut 10A adjacent to the fillet weld 11, and thus measuring the depth of undercut 10A. Each of the pivot arm arrows 2C, 2D and 2E are simultaneously indicating the undercut depth through the windows in the pivot arm 2 and against the pivot arm 0.01 inch scale 1E, the pivot arm mm scale 1F and the pivot arm 1/64 inch scale 1J, respectively.

In a schematic illustration, FIG. 6 evidences the rear face of the welding gauge 100, with pivot arm 2 and the pivot arm point 2A visible due to the cut of the main gauge plate arc corner 1R. Directly visible are top Hi-Lo arm 3, bottom Hi-Lo arm 4 and fillet height arm 6, each in its fully retracted position. The protractor arm 5 is partially rotated around the protractor arm rivet 5C so that the protractor arm 5 contacts the beveled edge 10B of the measured article 10, thereby measuring the angle of the bevel in comparison to the top edge of the measured article 10A, fitted against the main gauge plate lower edge 1P. The protractor arm scale point 5B indicates the bevel angle on the protractor scale 1H.

Figure 7:
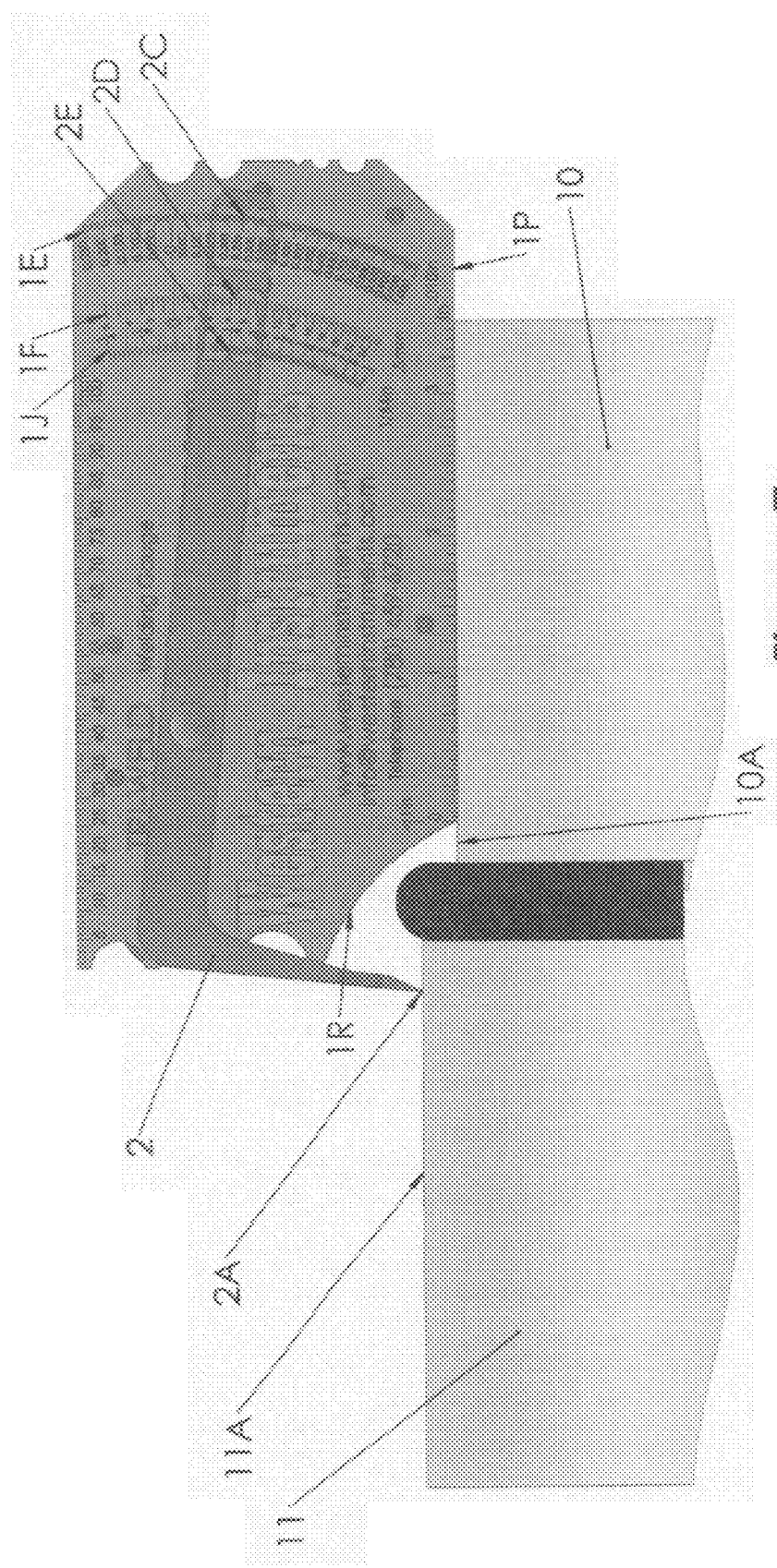
FIG. 7 is a line drawing evidencing the welding gauge from the front, measuring the alignment between two pieces of pipe or plate.

FIG. 7 is a schematic drawing evidencing welding gauge 100 being used to measure the distance between the top edges of two adjoining pieces of pipe, 10 and 11, being bonded together. Main gauge lower plate edge 1P is resting on the pipe edge 10A of pipe 10, while pivot arm 2 has been rotated to place pivot arm point 2A on the pipe edge 11A of pipe 11. As a result, each of the pivot arm arrows 2C, 2D and 2E are simultaneously indicating the distance by which the height of pipe edge 11A exceeds the height of pipe edge 10A, through the windows in the pivot arm 2 and against the pivot arm 0.01 inch scale 1E, the pivot arm mm scale 1F and the pivot arm 1/64 inch scale 1J, respectively.

FIG. 8 is a schematic drawing evidencing the weld gauge 100 measuring a weld height. The front of the weld gauge plate 1, with the fillet height arm 6 engaged in measuring the height of a fillet weld 12 in a Tee joint of perpendicular pieces 10 and 11. The main gauge plate angle corners 1A and 1B rest on the rightward-facing plate surface 10A on the upward-facing plate surface 11A, respectively, providing a point of comparison, while the fillet height arm point 6A extends outward to engage fillet weld 12, as fillet height slot 6C slides over fillet height arm rivets 6D, allowing fillet height arm measurement edge 6B to indicate a height measurement as it overlays fillet height mm scale 1I, fillet height 1/32 inch scale 1K and fillet height 0.0313 scale 1L.

FIG. 9 is a schematic drawing of weld gauge 100 wherein Hi-Lo arms 3 and 4 are extending to engage Hi-Lo arm tips 3A and 3B with two sections of pipe, 10 and 11, to measure the level of misalignment of the inside of the pipes or plates that are to be welded together. The Hi-Lo arms 3 and 4 have been deployed and are indicating measurements as described with regard to FIG. 2.

FIG. 10 is a schematic drawing evidencing the welding gauge 100 measuring a weld height. The front of the weld gauge plate 1, with the pivot arm 2 engaged in measuring the height of a fillet weld 12 in a Tee joint of two plates 10 and 11. The main plate gauge lower edge 1P rests on the upward-facing plate surface 10A, providing a point of comparison, while the pivot arm 2 has rotated clockwise to raise the pivot arm tip 2A according to the height of the weld 12. Each of the pivot arm arrows 2C, 2D and 2E are simultaneously indicating the weld height through the windows in the pivot arm 2 and against the pivot arm 0.01 inch scale 1E, the pivot arm mm scale 1F and the pivot arm 1/64 inch scale 1J, respectively.

Figure 11:
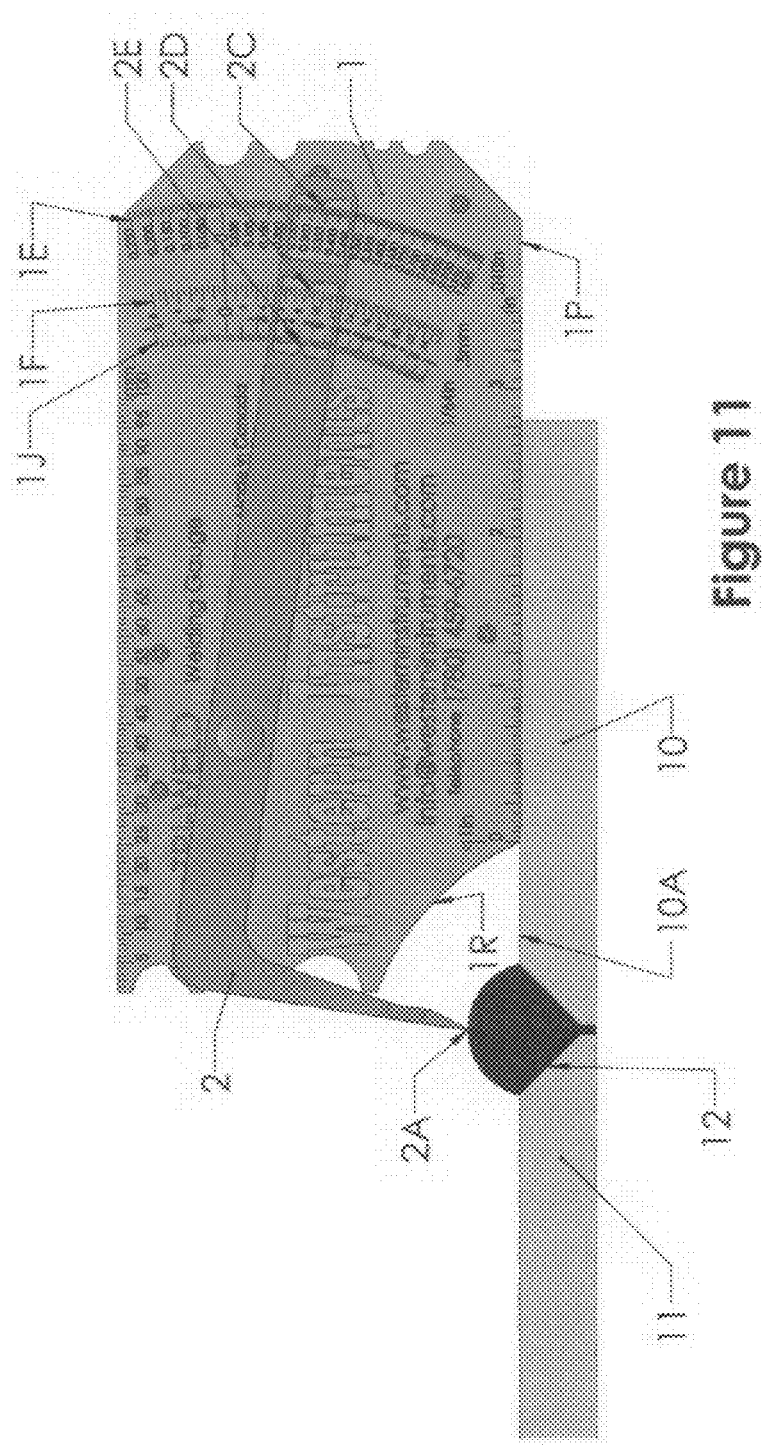
FIG. 11 is a line drawing evidencing the welding gauge from the front, engaged in measuring a fillet weld height.

FIG. 11 is a schematic drawing evidencing the welding gauge 100 measuring a weld height as in FIG. 10, except that the weld in this case is a fillet weld between two aligned pieces instead of a Tee joint weld.

FIG. 12 is a schematic drawing of the welding gauge 100, evidencing the rear face of the main gauge plate 1, with taper gauge 7 rotating outward around taper gauge rivet 7D, taper gauge adjacent edges 7A and 7B inserted through the gap between welding pieces 11 and 10, and taper gauge scale 7C indicating a measurement of the width of such gap.

FIG. 13 is a schematic drawing evidencing another preferred embodiment of a taper gauge, this time wherein taper gauge markings appear on the shorter aspect of pivot arm 2, wherein pivot arm adjacent edges 2F and 2G project into the gap between welding pieces 10 and 11 to measure the gap between them.

The invention has been explained based on preferred exemplary embodiments without being limited to these exemplary embodiments. One trained in the art will know numerous variations and embodiments of the method according to the invention as well as the device according to the invention without leaving the scope of the inventive idea. The features of individual exemplary embodiments can be arbitrarily combined or interchanged with features of other exemplary embodiments to the extent compatibility is given.

LIST OF REFERENCE NUMBERS 1 main gauge plate
1A main gauge plate angle corner

1B-C main gauge plate angle corner
1E pivot arm 0.01 inch scale
1F pivot arm 0.5 mm scale
1H protractor scale
1I fillet height mm scale
1J pivot arm 1/64 inch scale
1K fillet height 1/32 inch scale
1L fillet height 0.0313 scale
1M right Hi-Lo mm scale
1N Hi-Lo inches scale
1W left Hi-Lo mm scale
1P main gauge plate lower edge
1R main gauge plate arc corner
1S main gauge plate top edge
2 pivot arm
2A pivot arm tip
2C pivot arm 0.01 inch arrow
2D pivot arm 0.5 mm arrow
2E pivot arm 1/64 inch arrow
2F-G pivot arm adjacent edges
3 top Hi-Lo arm
3A top Hi-Lo arm tip
3B top Hi-Lo arm slot
3C top Hi-Lo arm measurement edge
3D top Hi-Lo arm rivets
4 bottom Hi-Lo arm
4A bottom Hi-Lo arm tip
4B bottom Hi-Lo arm slot
4C bottom Hi-Lo arm measurement edge
4D bottom Hi-Lo arm rivets
5 protractor arm
5A-B protractor arm points
5C protractor arm adjacent edges
5D protractor arm rivet
6 fillet height arm
6A fillet height arm point
6B fillet height arm measurement edge
6C fillet height arm slot
6D fillet height arm rivets
7 taper gauge
7A-B taper gauge adjacent edges
7C taper gauge scale
7D taper gauge rivet
8 wave washer
9 pivot arm rivet
100 welding gauge The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A welding gauge comprising: a main gauge plate and multiple measurement devices attached to such main gauge plate, including but not limited to two or more of: a ruler, a weld height gauge, a protractor gauge, a Hi-Lo gauge, and a fillet height gauge, wherein each measurement device overlays a measurement scale on the main gauge plate and is riveted to the main gauge plate such that the device may be extended beyond and retracted within the main gauge plate borders, either by sliding or rotating.

2. The welding gauge of claim 1, further comprising a taper gauge.

3. The welding gauge of claim 1, wherein the main gauge plate and all other components are manufactured from the group of materials consisting of: stainless steel, aluminum, titanium, another non-magnetic metal or alloy, or plastic.

4. The welding gauge of claim 3, wherein the main gauge plate is comprised of aluminum and is anodized.

5. The welding gauge of claim 4, wherein the measurement scales are laser etched into the anodized surface of the main gauge plate.

6. The welding gauge of claim 4, wherein the articulated parts are comprised of stainless steel.

7. The welding gauge of claim 1, further comprising wherein each rivet protrudes through a wave washer, made of either metal or plastic, situated between the main gauge plate and the riveted measurement device.

8. The welding gauge of claim 1, wherein each measurement scale comprises one or more scales from the group consisting of: a 0.5 mm scale, a 1.0 mm scale, a 0.01 inch scale, a 1/64 inch scale, a 1/32 inch scale, a 0.0313 inch scale, or degrees.

9. The welding gauge of claim 1, wherein the main gauge plate further comprises on its edge(s) one or more marked, semicircular cutouts on the edges of the main gauge plate for quickly measuring the diameter of circular objects.

10. The welding gauge of claim 1, wherein the fully-assembled gauge has a depth of no more than 1/4 inch.

11. The welding gauge of claim 1, wherein the fully-assembled gauge, with all gauge arms retracted within the borders of the main gauge plate, has a length of no more than 6" and a height of no more than 3".

12. The welding gauge of claim 1, wherein the weld height gauge comprises an L-shaped pivot arm, such pivot arm comprising a point at the end of its shorter member for resting on a weld, and one or more windows cut into its larger member, such window(s) overlaying one or more scale markings allowing the user to measure weld height.

13. The welding gauge of claim 12, wherein the shorter member of the L-shaped pivot arm is marked with a scale, allowing such shorter to serve as a taper gauge.

14. The welding gauge of claim 1, wherein the protractor gauge comprises a hexagonal protractor arm with two interchangeable ends, each comprising a point, wherein one end rotates to extend beyond the border of the main gauge plate and the other end overlays a semicircular protractor scale indicating the measurement of an angle in degrees.

15. The welding gauge of claim 1, wherein each Hi-Lo gauge comprises two adjacent, parallel Hi-Lo arms, with each such arm comprising a pointed end and a flat end, wherein each Hi-Lo arm slides independently of the other, allowing each Hi-Lo arm's pointed end to extend past the border of the main gauge plate, and wherein each measurement edge overlays one or more measurement scales on the main gauge plate, thereby allowing the measurement of the disparity in the heights of two adjacent points.

16. The welding gauge of claim 1, wherein the fillet height gauge comprises an arm that slides back and forth, wherein the arm comprises a pointed end and a flat end, with the pointed end sliding to extend past the border of the main gauge plate, and the flat end overlaying one or more measurement scales on the main gauge plate.

17. The welding gauge of claim 2, wherein the taper gauge comprises a taper gauge arm, such taper gauge arm comprising a tapered end, a riveted end and one or more measurement scales marked on the face(s) of the taper gauge arm, wherein the tapering gauge arm rotates around the riveted end, allowing the tapered end to extend beyond the borders of the main gauge plate.

18. The welding gauge of claim 17, wherein the taper gauge arm is comprised of anodized aluminum and one or more scales are marked on the taper gauge arm by laser etching.

19. A welding gauge comprising: a main gauge plate and multiple measurement devices, including but not limited to: a ruler, a weld height gauge, a protractor gauge, a Hi-Lo gauge, and a fillet height gauge, wherein each measurement device overlays a measurement scale on the main gauge plate and is riveted to the main gauge plate such that the device may be extended beyond and retracted within the main gauge plate borders, and wherein (i) each of the weld height gauge and protractor gauge are single-rived to the main gauge plate, allowing the arm of each such gauge to rotate, and (ii) each of the Hi-Lo gauge and the fillet gauge are double riveted through a channel in the arm(s) of such gauge, allowing each such arm to slide.

20. The welding gauge of claim 19, wherein the arms of each of the weld height gauge, protractor gauge, Hi-Low gauge, and fillet height gauge are configured on the main gauge plate such that no such arm makes contact another welding gauge component when sliding or rotating.

* * * * *